3,069,402
POLYACRYLONITRILE AND METHOD OF PREPARATION
Charles L. Smart, Millington, N.J., assignor to Celanese Corporation of America, New York, N.Y., a corporation of Delaware
No Drawing. Filed Oct. 17, 1957, Ser. No. 690,617
9 Claims. (Cl. 260—88.7)

This invention relates to a novel polymer of acrylonitrile and to its method of preparation. In particular, it relates to a heat stable, crystalline polymer of acrylonitrile and to its method of preparation.

Polyacrylonitrile is known as a useful polymer capable of being molded into useful articles or cast into film when plasticized but which has found its greatest commercial utility in the preparation of synthetic fibers.

It is an object of this invention to produce crystalline polyacrylonitrile of high melting point and excellent heat stability.

It is also an object of this invention to provide a novel method of polymerizing acrylonitrile, utilizing a catalytic material heretofore considered inoperative.

These and other objects are achieved by a process for polymerizing acrylonitrile which comprises contacting said acrylonitrile at a polymerization temperature with boron trifluoride·diethyl etherate, preferably in the presence of moisture and molecular oxygen.

It has been considered that boron trifluoride and its complexes, since they are cationic polymerization catalysts, are not catalysts for polymerizing acrylonitrile, which was believed to require an anionic or a free radical polymerization system. It has also been considered that molecular oxygen is a stabilizer for acrylonitrile and that it inhibits polymerization even in the presence of strong catalysts. It is therefore surprising that boron trifluoride·etherate, particularly in the presence of molecular oxygen and water, is an effective catalyst for the polymerization of acrylonitrile and that it produces a polymer of unique properties. It is to be understood that the term "boron trifluoride·etherate" as used herein refers to the complex of boron trifluoride and diethyl ether.

The unique polyacrylonitriles of this invention are generally prepared by admixing the monomer with between about 0.1 and about 2.0 weight percent of boron trifluoride·etherate and preferably from about 0.1 to about 2.0 weight percent of water in the presence of air and heating the admixture to a temperature between about 35° and 80° C. for a period between about 6 and 144 hours. It is preferred that the proportion of boron trifluoride·etherate be limited to between about 0.1 and about 0.5 weight percent; that the proportion of water be limited to between about 0.1 and about 0.5 weight percent; that the temperature of polymerization be limited to between about 45° and about 60° C.

If desired, the acrylonitrile may be polymerized in the presence of an inert organic solvent for the monomer such as benzene, toluene, cyclohexane, hexane, dimethyl formamide, γ-valerolactone or dimethyl acetamide. Preferably, the polymer separates from solution as it is formed. In some cases a monomer solvent which is also a solvent for the polymer may be used. The solvent may comprise from about 1 to about 50 weight percent of the reaction mixture.

The polyacrylonitriles of the present invention are preferably homopolymers although copolymerization with up to 15 mole percent of one or more ethylenically unsaturated monomers will not prevent the formation of a heat stable polymer. Among the other ethylenically unsaturated monomers which may be included are vinyl chloride, acrylamide, ethyl acrylate, methyl methacrylate and styrene.

The high thermal stability of the polymers of the present invention are apparent when the polymers are compared with acrylonitrile polymers prepared in the presence of free radical-producing initiators, in accordance with the prior art.

The inherent viscosities of the polymers of this invention, measured in 0.1% solution in dimethyl formamide are above 12 deciliters per gram, as contrasted with the polymers produced by free radical mechanism, which have inherent viscosities below 9 deciliters per gram.

When polymer particles ground to pass a 20 mesh screen are heated from room temperature at a 20° C. per minute rate, the polymers of the present invention show first signs of decoloration (yellowing) at temperatures above 220° C. while the polymers produced by free radical mechanism show decoloration at temperatures below 180° C.

Crystallinity of the polymers of this invention is indicated by the birefringence of the polymers upon moderate heating and the maintenance of their birefringent properties at elevated temperatures. When the polyacrylonitriles of this invention are examined under polarized light on a hot stage microscope they are observed to become birefringent and their birefringent properties are substantially unchanged as the material is heated up to 350° C. over a period of 1.75 hours. In contrast, the polyacrylonitrile of the prior art is principally a mixture of material of no birefringence and material of very low birefringence. Upon heating the prior art polymer to a temperature of 250° C. over a period of 1.25 hours, the low birefringent material loses its birefringence and the non-birefringent material decomposes.

*Example I (Prior Art)*

All "parts" in this example are parts by volume unless otherwise stated.

To 320 parts of purified acrylonitrile there was added 1 part of benzoyl peroxide. After 100 minutes at 25° C. under nitrogen, a chalky white solid was formed. The mass was pulverized and washed exhaustively with 1% aqueous acetic acid and then successively with water, methanol and ether. After drying, the polymer was held in a vacuum desiccator over silica gel.

*Example II*

All "parts" in this example are parts by volume unless otherwise stated.

1000 parts of distilled acrylonitrile, 5 parts of boron trifluoride·etherate and 5 parts of water were sealed in the presence of nitrogen containing a slight amount of air in a combustion tube. After tumbling at 45° C. for approximately 90 hours, tiny white particles appeared. After 48 additional hours about 60 to 70% of the total reaction mass appeared as white material. After 24 additional hours 90 to 100% of the mixture was solid white polymer.

Under identical conditions acrylonitrile in the absence of catalysts yields no visible polymer.

The polymers prepared in accordance with Examples I and II were compared with respect to inherent viscosity in 0.1% solutions in dimethyl formamide.

Results:                              Deciliters per gram
  Example I_____  8.31 to 8.62
  Example II_____  12.94 to 13.20

The polymers prepared in accordance with Examples I and II were compared with respect to thermoplastic behavior by being subjected in 0.3 gram samples side by side in a small copper mold for 5 minutes to a temperature of 200° C. at a pressure of 5500 p.s.i. The polymer prepared in accordance with Example I formed a fused, reddish-brown, brittle film. The polymer of Example II appeared unchanged except for a light yellow off-color.

In a further comparison of thermoplastic behavior, 0.3 gram of dioctyl phthalate was added to 0.8 gram samples of each polymer. After mixing, each mixture was molded for 25 minutes at 175° C. under 50,000 p.s.i. Results:

Example I polymer—dark red fused films
    Color designation according to Munsell—
        Hue number _____ 7.5
        Hue symbol _____ 7.5R
        Value _____ 3
        Chroma _____ 8

Example II polymer—Ivory colored, partially fused particles
    Color designation according to Munsell—
        Hue symbol _____ 5.0Y
        Value _____ 8
        Chroma _____ 4

The polymers were compared in thermal behavior by being ground to pass a 20-mesh screen and placed side by side on a Fisher-Johns heating block. On heating from room temperature at a 20° C. per minute rate, the samples of Example I polymer showed first signs of decoloration at 170 to 173° C. while the samples of Example II polymer showed first signs of decoloration at 224 to 230° C.

It is to be understood that the foregoing detailed description is given merely by way of illustration and that many variations may be made therein without departing from the spirit of my invention.

Having described my invention what I desire to secure by Letters Patent is:

1. A process for the polymerization of acrylonitrile which comprises contacting said acrylonitrile at a polymerization temperature with boron trifluoride·diethyl etherate.

2. A process for the polymerization of acrylonitrile which comprises contacting said acrylonitrile at a polymerization temperature with boron trifluoride·diethyl etherate in the presence of molecular oxygen.

3. A process for the polymerization of acrylonitrile which comprises contacting said acrylonitrile at a polymerization temperature with boron trifluoride·diethyl etherate in the presence of moisture.

4. A process for the polymerization of acrylonitrile which comprises contacting said acrylonitrile at a polymerization temperature with boron trifluoride·diethyl etherate in the presence of moisture and molecular oxygen.

5. A process for the polymerization of acrylonitrile which comprises contacting said acrylonitrile at a temperature between about 35° and about 80° C. with boron trifluoride·diethyl etherate in the presence of moisture and molecular oxygen.

6. A process for the polymerization of acrylonitrile which comprises contacting said acrylonitrile at a temperature between about 35° and about 80° C. with boron trifluoride·diethyl etherate in the presence of from about 0.1 to 2.0 weight percent of moisture based on the weight of acrylonitrile and in the presence of an oxygen-containing atmosphere.

7. The polymerization process of claim 1 wherein said acrylonitrile is in bulk.

8. The process of claim 1 wherein said acrylonitrile is dissolved in a liquid which is not a solvent for polyacrylonitrile.

9. The process of claim 1 wherein said acrylonitrile is dissolved in a liquid which is also a solvent for polyacrylonitrile.

References Cited in the file of this patent
UNITED STATES PATENTS
2,421,679    Watkins _____ Sept. 2, 1947
FOREIGN PATENTS
473,117    Canada _____ Apr. 24, 1951
OTHER REFERENCES
"Polymer Processes," by Schildknecht (1956), p. 201.